United States Patent [19]

Carlon et al.

[11] Patent Number: 5,052,618

[45] Date of Patent: Oct. 1, 1991

[54] METHOD AND APPARATUS FOR PROTECTING CROPS FROM FROST BY JET-DISPERSED, MICROENCAPSULATED AEROSOLS

[75] Inventors: Hugh R. Carlon, Fallston; Raymond P. Tytus, Bel Air; Arthur K. Stuempfle, Edgewood, all of Md.

[73] Assignee: The United States of America as represented by the Secretary of the Army, Washington, D.C.

[21] Appl. No.: 559,114

[22] Filed: Jul. 26, 1990

[51] Int. Cl.$^5$ ............................ B05B 1/00; B05B 1/24
[52] U.S. Cl. ...................................... 239/77; 239/129; 239/427; 239/429; 47/2
[58] Field of Search ................. 239/77, 127, 129, 135, 239/427, 428; 47/2

[56] References Cited

U.S. PATENT DOCUMENTS

| | | | |
|---|---|---|---|
| 3,521,817 | 7/1970 | Curtis et al. | 239/77 |
| 3,575,349 | 4/1971 | Stahl et al. | 239/129 |
| 3,654,175 | 4/1972 | Henderson | 47/2 |
| 3,788,547 | 1/1974 | Stahl et al. | 239/129 |
| 4,721,245 | 1/1988 | van Zweeden | 239/127 |

*Primary Examiner*—Andres Kashnikow
*Assistant Examiner*—Lesley D. Morris
*Attorney, Agent, or Firm*—Anthony T. Lane; Edward Goldberg; Michael C. Sachs

[57] ABSTRACT

The invention includes an apparatus for protecting plants from frost. A jet turbine engine has an input into which a first liquid and a second liquid are injected into the exhaust stream of the engine. The jet engine also has an exhaust nozzle supplying an aerosol of the first liquid microencapsulated in the second liquid. The aerosol is dispersed about the plants to be protected from frost thereby to form a mist which acts as a protective radiation barrier for the plants. The invention also includes a method for protecting plants from frost.

12 Claims, 1 Drawing Sheet

METHOD AND APPARATUS FOR PROTECTING CROPS FROM FROST BY JET-DISPERSED, MICROENCAPSULATED AEROSOLS

GOVERNMENT INTEREST

The invention described herein may be made, used or licensed by or for the government, for governmental purposes, without the payment to us of any royalties thereon.

BACKGROUND OF THE INVENTION

This invention generally relates to an apparatus and method of protecting crops from frost and, in particular, a jet-dispersed, microencapsulated aerosol for protecting crops against frost.

The problem of crop frost protection, for example, protection of orange crops in Florida, has existed in many parts of the world since the beginnings of agriculture. In the past, smoke pots, fires and other cumbersome methods of generating heat have been employed with limited success. More recently, water fogs have been applied to the plants to shield them from the frost. Evaporation of artificial water fogs can be retarded by the application of coatings of long-chain fatty alcohols to the droplets during generation. It has been shown that water fogs coated with cetyl alcohol from a commercial generator have droplet sizes which are inversely proportional to the amount of alcohol used and that, while the coatings affect evaporation rate in droplet size, stabilized water fogs otherwise are spectrally similar to uncoated fogs. In such systems, evaporation was retarded by the condensation of the long-chain alcohol vapor onto water droplets coming from a steam bath; such alcohols, for example, have been used to reduce evaporation from city reservoirs since even a monolayer is effective. But the droplet system has limited utility because the droplets are not uniformly coated. Furthermore, evaporation was retarded only for several seconds, and an effective fog blanket to shield against frost could be maintained only under near-saturation atmospheric conditions. What is needed is an effective way to disperse and stabilize, for minutes to hours, large quantities of water or of other droplets to form a protective frost-resistant crop blanket.

Dispersion of aerosols by injection of fluids or solids into jet engine exhaust gases has been known. But such dispersion techniques have used jet dispersion on a massive scale as a means for disinfecting crops by dispersing insecticides and other materials. Thus, a jet engine is a feasible alternative for dispersing disinfectants as well as fertilizers to crops in the growing season.

There is a need for a system which employs dispersion techniques similar to jet dispersion for distributing microencapsulated droplets of water which have a high latent heat of evaporization and have accessibility in the field without the logistical burden of supplying blocks of cetyl alcohol.

SUMMARY OF THE INVENTION

It is an object of this invention to provide a method for dispersing microencapsulated aerosols which can be used on a wide scale and which will effectively protect crops against frost for extended periods of time.

It is an object of this invention to provide a jet dispersion apparatus and method for dispersing microencapsulated aerosols to protect crops against frost.

It is another object of this invention to provide an apparatus and method which can disperse water in microencapsulated form onto crops to protect the crops against frost.

It is still another object of this invention to provide a jet disperser for water droplets.

The invention includes an apparatus for protecting plants from frost. A jet engine has a first input into which a first liquid and a second liquid are injected into the exhaust stream of the engine. The jet engine has an output for producing an aerosol of the first liquid microencapsulated in the second liquid. Means connected to the output disperses the aerosol about the plants to be protected from frost thereby to form a mist which acts as a protective radiation barrier for the plants.

The invention also includes a method for protecting plants from frost including the following steps. First and second liquids are injected into an exhaust stream of a jet engine. The jet engine produces an aerosol of the first liquid microencapsulated in the second liquid. The aerosol is dispersed about the plants to be protected from frost thereby to form a mist which acts as a protective radiation barrier for the plants.

Other objects and features will be in part apparent and in part pointed out hereinafter.

BRIEF DESCRIPTION OF THE DRAWINGS

FIG. 1 is a perspective schematic diagram of one preferred embodiment of a jet turbine engine according to the invention for dispersing an aerosol over plants.

FIG. 2 is a schematic diagram, partially in cross section, of one preferred embodiment of a jet turbine engine according to the invention having first and second liquids being injected into its exhaust stream to form microencapsulated aerosols.

FIG. 3 is a cross sectional view of a microcapsule according to the invention.

Corresponding reference characters indicate corresponding parts throughout the several view of the drawings.

DETAILED DESCRIPTION OF THE PREFERRED EMBODIMENT

The invention utilizes a jet turbine aerosol disperser to produce and disperse large quantities of a microencapsulated aerosol which is generated directly by the jet during the dispersion process itself. In general, such dispersers yield particle sizes in the range of 1-10 micrometers which is essentially the range necessary for good dispersion in the atmosphere. One key aspect of the invention is the technique of dispersing water by jet turbines to microencapsulate in the water and thereby inhibit and stabilize its evaporation so that the microencapsulated aerosols may be used for crop protection and other applications.

Preferably, a jet turbine engine is used which is capable of delivering one kilogram per second of clean, dry exhaust gas at 500° C. and 250 meters per second velocity. For convenience, the engine can be mounted on a trailer with a cover so that it can be moved about for experimentation or for use at various locations. The system includes a jet turbine engine 100 having a reducer 102 defining an exhaust port 104. For example, a Noel Penny Turbines engine Model NPT 100 may be used for such purposes.

Figures 1, 2, 3:
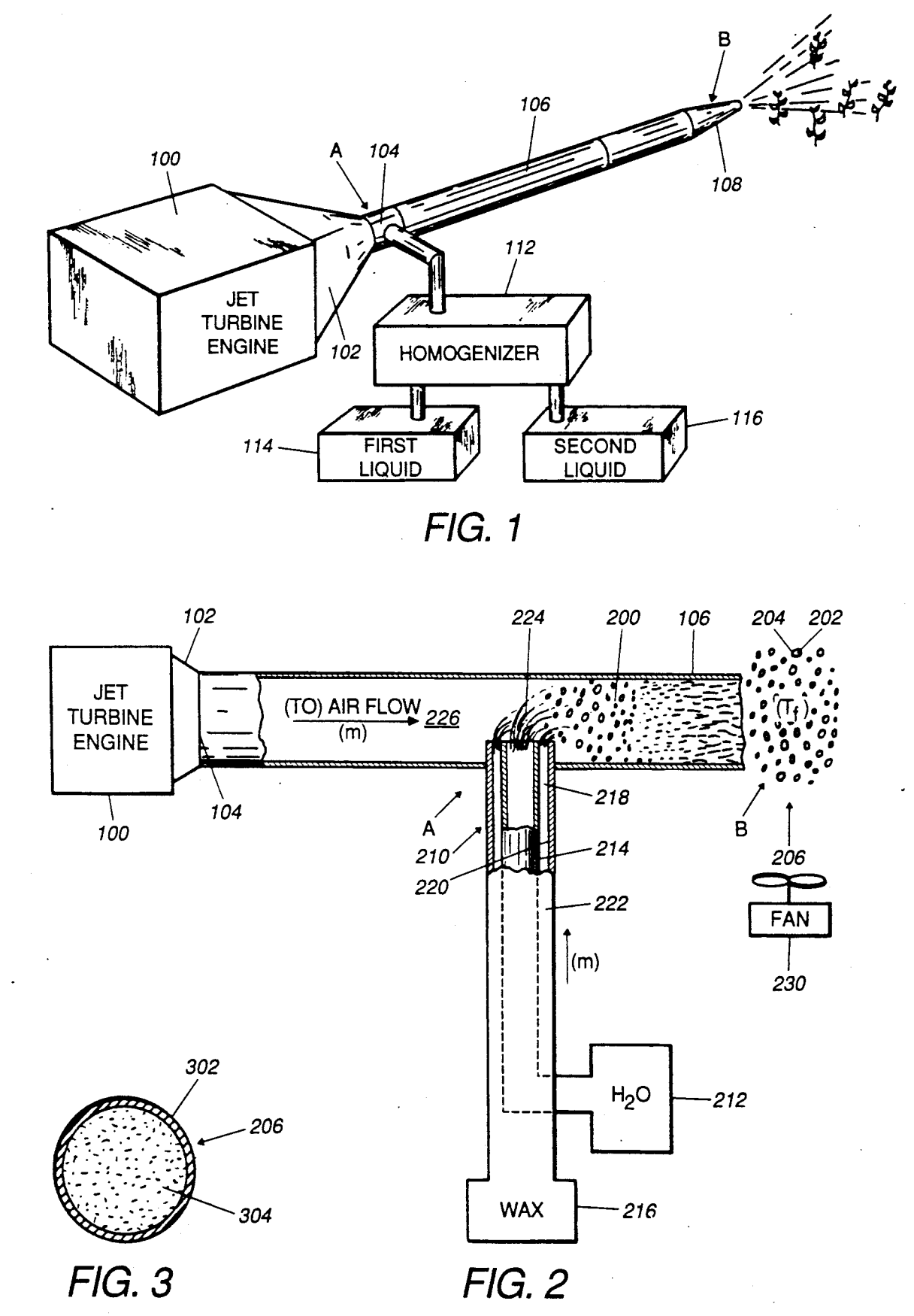

One preferred embodiment of the system according to the invention is shown diagrammatically in FIG. 1. Liquids which produce the microencapsulated aerosols may be injected at point A, near the exhaust port 104 upstream of a long exhaust conduit 106, which may be connected to the exhaust port 104. Alternatively, the liquids may be injected at point B, near the nozzle 108 at the end of the exhaust conduit 106. When liquids are injected into the hot gas exhaust stream from the exhaust port 104, the liquids are immediately broken into fine droplets that begin to evaporate as shown schematically in FIG. 2 and referred to by reference character 200. By controlling the engine revolutions per minute and other system operating parameters, it is possible to control the size and other properties of the fine droplets and, as a result, create microcapsules. One parameter which particularly controls the size and preferably should be constant during liquid injection is the mass ratio of the liquid injected "m" to the exhaust gas "M" (where a K factor is defined as K equal to m/M).

When liquids are injected at point B, breakup into droplets is similar to the breakup that occurs when the liquids are injected at point A, but the droplets and gases do not have time to mix completely. Instead, at point B, a thermal quenching occurs as the droplets mix with cool atmospheric air. This quenching can, itself, produce microencapsules, e.g., water in a wax coating, as will be explained in greater detail below. $T_o$ refers to the initial temperature of the hot, dry exhaust gas stream upstream of the liquid injection pipe or nozzle. $T_f$ refers to the final exhaust gas stream temperature after the liquid and gas streams have been mixed in the exhaust conduit 104, if injected at point A, or after the mixing with cool, atmospheric air, if injected at point B near the exhaust nozzle.

A cloche (not shown) is an optional feature and is preferably used to capture the aerosol particles for study or for dispersion onto plants located within the cloche. If desired, the system of the invention could be used to treat crops under a cloche with insecticide, plant food or other treatments. In general, the cloche is merely a plastic tunnel so that it is not required for most commercial applications such as frost protection. when using a cloche, the jet turbine engine 100 may be mounted on a trailer (not shown), in one preferred embodiment, with a long stainless steel flexible exhaust hose connected to exhaust port 104 such as exhaust conduit 106 and aimed toward the dispersion point such as the crops under the cloche. Other pipes or hoses of various lengths can be used in place of or in addition to the exhaust conduit 106 illustrated in the figures for various purposes.

In one preferred embodiment, water 212 or a water soluble material is microencapsulated in a shell of water insoluble materials such as wax 216 to produce a mist or aerosol 206 which can be applied to plants or crops to provide frost protection. As shown in FIG. 3, the shell 302 retards evaporation of the microencapsulated water 304 or releases the water 302 in response to some specific change in environment, such as an increase in temperature, which causes the shell to break up. Alternatively, it is contemplated that water insoluble materials may be encapsulated in shell materials that are either water soluble or water insoluble. Such water insoluble materials may be used instead of water to produce a mist or aerosol that would effectively protect plants from freezing and would be modifiable by heat, temperature, or other desired parametric controls, or for other purposes.

One preferred embodiment of the invention produces an aerosol of water in a wax shell. In this embodiment, the liquids are injected at point B instead of at point A as illustrated in FIG. 1, near the end of the exhaust conduit 106. A double walled tube 210 is used to inject the two liquids as illustrated in FIG. 2. Water from a reservoir 212 or other source flows through the inner concentric tube 214 and melted paraffin wax or bee's wax from a reservoir 216 or other source is pumped through the annulus 218 formed by inner surface 220 of the outer concentric tube 222 and the outer surface of inner concentric tube 214. The resulting mix 224 then breaks up into droplets 200 as it enters the high velocity gas stream 226 of the jet turbine engine 100 to produce an aerosol 206 of wax-coated water microcapsules by quenching in the cool atmospheric air. The resulting aerosol 206 can then be directed or sprayed over the plants to be protected in the form of a mist which acts as a protective radiation barrier. The encapsulated water 204 in a wax shell 202 will not evaporate as long as the shells maintain their integrity, and the aerosol 206 will remain airborne for long periods of time. If desired, fans 230 may be placed nearby to keep the aerosol 206 airborne indefinitely.

The protective mist or aerosol 206 is a barrier formed by the water vapor encapsulated in the wax and can be reapplied to the crops as needed. Depending on the shell material release mechanism desired, such as temperature or pressure, other properties of the barrier can be controlled. For example, if the shell material melts in sunlight, it can be tailored to release the water and dissipate the barrier mist after sunrise, so that the sunlight can warm the crop and stimulate its growth.

More refined techniques can be used to microencapsulate the water into microsphere aerosols 206 produced by the jet turbine 100. For example, a homogenizer 112 as shown in FIG. 1 may be used to mix the first liquid 114 and the second liquid 116. Essentially, the homogenizer 112 functions as a powered heater to generate small spheres that are blown through conduit 106 to form the aerosol. For example, the homogenizer 112 may be used when a single annulus as shown in FIG. 2 does not generate small enough spheres or aerosol particles.

The homogenizer 112 may be used to encapsulate water insoluble materials within water soluble or water insoluble shells. In one preferred embodiment, microsphere aerosols 206 of soy bean oil encapsulated in gelatin or starch can be produced by homogenizing the oil with 150 bloom pork gelatin (type A) or starches such as "CAPSUL" or purity gums which are film formers. It is possible to produce crop frost protecting aerosols 206 using mist produced in this way, for special purposes, instead of water containing aerosols.

A large variety of commercially available materials can be used as shell materials for the water. These materials would include high melting hydrocarbon waxes, hydrocarbon resins, polyethylene and its derivatives, and or any of the water soluble polymers such as illustrated in the following Table I:

TABLE I

| Polymer | WATER-SOLUBLE POLYMERS | |
|---|---|---|
| | Organic Solvents | Remarks |
| Gelatin | N/A | Good film former; O$_2$ barrier; requires mild |

TABLE I-continued

WATER-SOLUBLE POLYMERS

| Polymer | Organic Solvents | Remarks |
|---|---|---|
| | | heat (approx. 120° F.) for processing; medium to high solids solution capability. |
| Gum arabic | N/A | Film former; room temperature (RT) processing; high solids. |
| Sodium caseinate | N/A | Film former; RT processing; low to medium solids. |
| Sodium alginate | N/A | Film former; RT processing; low solids |
| Sodium polypectate | N/A | Good film former; RT processing; low solids |
| Carrageenan | N/A | Film former; requires heat (approx. 140° F.) for processing; very low solids. |
| Modified starches | N/A | Film formers; some require heat for processing; low to high solids. |
| Methylcellulose | Benzyl alcohol, ethylene chlorohydrin, pyridine, formic acid, aniline, methylene chloride-alcohol mix | Good film former; RT processing, low to medium solids. |
| Carboxymethylcellulose | N/A | Film former; RT processing; low solids. |
| Hydroxyethylcellulose | Formalin, formic acid, diethylene triamine, dimethyl formamide, dimethyl sulfoxide | Film former; RT processing; low to medium solids. |
| Hydroxypropylmethylcellulose | Benzaldehyde, furfuryl alcohol, methyl lactate, alcohol-water mixtures | Film former; RT processing, low solids. |
| Polyvinyl alcohol | N/A | Good film former; RT processing; low to high solids. |
| Polyacrylic acid | Methanol, ethanol, dioxane, ethylene glycol, dimethylforamide | Film former; RT processing; medium to high solids. |
| Polymethacrylic acid | Same as above. | Film former; RT processing; medium to high solids. |
| Polyacrylamide | Formamide, glycerine, acetic acid | Film former; RT processing; medium to high solids. |
| Polyvinyl pyrrolidone | Alcohols, ether-alcohols, chlorinated hydrocarbons, amines, acids | Film former; RT processing; high solids. |
| Polyethylene oxide | Chlorinated solvents, alcohols, benzene, methyl ethyl ketone, ethylacetate, amines | Film former; RT processing; low solids |
| Polymethyl vinyl ether/maleic anhydride | Alcohols, aldehydes, ketones, pyridine | Film former; RT processing; medium to high solids. |
| Ethylene maleic anhydride | Acetone, pyridine, dimethylformamide | Film former; RT processing; low to high solids. |

NOTE:
Percent solids in solution:
Low - <5%
Medium - 5-15%
High - >15%

The fill material can include almost any material which is not strongly water-soluble, including biological and toxins. Alternatively, water-soluble fills may be encapsulated in insoluble shells.

In another preferred embodiment, microencapsulated aerosol particles of water-insoluble materials in water-soluble shell materials may be produced. Initially, an emulsion of water and a suitable shell material is produced in a commercial homogenizer such as a Gaulin Model 15M-8TA. The size of the water droplets in the emulsion is determined by the operating pressure of the homogenizer. The higher the pressure, the smaller the water droplet size. The emulsion is then caused to flow by pumping or otherwise through appropriate conduits to the exhaust conduit 106 connected to the exhaust port 104 at point A. When the homogenized liquid is injected at this point, the emulsion breaks up in hot gases, as shown schematically in FIG. 2, under the influence of the exhaust gas stream velocity. The emulsion breaks up into individual droplets coated by an exterior shell material. The droplets then flow through the exhaust conduit 106, preferably having a length of two to four meters, mixing all the way with the hot gases until a final, equilibrium temperature of the stream, $T_f$, is reached. At this point, the water insoluble shell material forms about the water droplets and hardens as evaporation takes place. One specific recipe to achieve such a result would be 10% by weight 150 bloom gelatin in 90% by weight deionized water placed in the homogenizer after the gelatin has swelled and mixed with 5% by weight of soy bean oil and less than 0.1% emulsifier or a surfactant, if desired, such as "TWEEN" or "SPAN" 20-60 series produced by ICI Americas, Inc.

More specific examples of suitable materials would be apparent to those skilled in the art. When water is used as a solvent or carrier liquid, it serves several functions including dissolving the coating for dispersion, controlling the gas stream temperature and, thus, its velocity, and protecting the encapsulated materials against stresses if it is temperature sensitive. This protection occurs because of cooling by the evaporating water. The latter consideration is especially important if the material is a viable biological one.

In another preferred embodiment, water-insoluble liquids are encapsulated in mineral oil, soy bean oil or other vegetable oils or other soluble materials can be dissolved in these oils and carried within the microcapsules themselves. The shell materials can include film-forming starches, gelatins, polyvinyl alcohol, or other commercially available materials. To prepare emulsions in the homogenizer, stabilizers or surfactants may be required although polyvinyl alcohol is itself a surfactant and usually does not require the addition of other surfactants. Many gelatins and starches similarly do not require added surfactants to form emulsions. When surfactants are required, many are usable including alkylethers of polyvinyl, glycol (Tergitol TMN), alkylphenyl polyethylene glycol ethers (Tergitol NPX or NP2T), sorbitan fatty acid esters (Span) or mixtures of such esters, and polyoxyethylene sorbitan fatty acid esters (Tween).

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for protecting plants from frost, comprising:

a first liquid;

a second liquid;

a jet engine having an exhaust port supplying a stream of exhaust gases;

means for injecting the first liquid and the second liquid into the exhaust gas stream thereby forming an aerosol of the first liquid microencapsulated in the second liquid;

said means for injecting comprising:

a homogenizer having an input for receiving the first and second liquids and having an output connected to the exhaust port for supplying a homogenized mix of the first and second liquids into the exhaust stream; and means connected to the exhaust port for dispersing the aerosol about the plants to be protected from frost thereby to form a mist about the plants of the microcapsules which acts as a protective radiation barrier for the plants.

2. The apparatus of claim 1 wherein the first liquid is water and the second liquid is wax.

3. The apparatus of claim 1 wherein the means for injecting comprises a first conduit for carrying the first liquid into the jet engine and a second conduit coaxial with the first conduit, and forming a passageway between the outer wall of the first conduit and the inner wall of the second conduit, for carrying the second liquid into the jet engine.

4. The apparatus of claim 1 further comprising a homogenizer for receiving the first liquid and for receiving the second liquid, said homogenizer producing an emulsion of the first and second liquids, and means for supplying the emulsion to the injecting means.

5. The apparatus of claim 4 wherein the emulsion comprises oil with 150 bloom port gelatin (type A), starches, or purity gums which are film formers.

6. The apparatus of claim 4 wherein the emulsion comprises a water-insoluble material as the first liquid and a water soluble material as the second liquid.

7. The apparatus of claim 4 wherein the emulsion comprises 10% of weight 150 bloom gelatin and 90% by weight deionized water mixed with 5% by weight of soy bean oil after the gelatin has swelled.

8. The apparatus of claim 7 wherein the emulsion further comprises less than 0.1% emulsifier or surfactant.

9. The apparatus of claim 7 wherein the emulsion comprises the combination of a water-insoluble material selected from the group consisting of mineral oil, soy bean oil, and vegetable oil as the first liquid, and a material selected from the group consisting of film-forming starches, gelatins, and polyvinyl alcohol as the second liquid.

10. The apparatus of claim 9 wherein the emulsion further includes surfactants selected from the group consisting of alkylethers of polyvinyl glycol, alkylphenyl polyethylene glycol ethers, sorbitan fatty acid esters and polyoxyethylene sobitan fatty acid esters.

11. The apparatus of claim 4 wherein the first liquid is water and the second liquid is selected from the group of high melting hydrocarbon waxes, hydrocarbon resins and polyethylene and its derivatives.

12. The apparatus of claim 1 wherein the second liquid is an emulsion.

* * * * *